United States Patent [19]

Nishiwaki et al.

[11] Patent Number: 5,193,130

[45] Date of Patent: Mar. 9, 1993

[54] LIGHT DEFLECTING DEVICE

[75] Inventors: Seiji Nishiwaki, Katano; Yoshinao Taketomi, Moriguchi; Shinji Uchida, Osaka; Takaaki Tomita, Moriguchi; Junichi Asada, Ibaraki, all of Japan

[73] Assignee: Matsushita Electric Industrial Co., Ltd., Osaka, Japan

[21] Appl. No.: 474,763

[22] PCT Filed: Aug. 2, 1989

[86] PCT No.: PCT/JP89/00797
§ 371 Date: Mar. 20, 1990
§ 102(e) Date: Mar. 20, 1990

[87] PCT Pub. No.: WO90/01722
PCT Pub. Date: Feb. 22, 1990

[30] Foreign Application Priority Data

Aug. 5, 1988 [JP] Japan .................. 63-196584
Apr. 28, 1989 [JP] Japan .................. 1-109347

[51] Int. Cl.[5] .................................................. G02B 6/12
[52] U.S. Cl. .................................... 385/14; 385/2; 385/8
[58] Field of Search ............... 350/96.12, 96.13, 96.14, 350/347 V, 347 E; 385/1, 2, 4, 8, 9, 14; 359/93, 94, 84, 42, 95

[56] References Cited

U.S. PATENT DOCUMENTS

| 3,995,937 | 12/1976 | Baues et al. ............... | 350/96.11 |
| 4,054,362 | 10/1977 | Baues ...................... | 350/347 V X |
| 4,095,869 | 6/1978 | Reichelt et al. ............ | 350/96.14 |
| 4,729,640 | 3/1988 | Sakata ..................... | 359/42 |
| 4,801,184 | 1/1989 | Revelli .................... | 385/8 |
| 4,878,742 | 11/1989 | Ohkubo et al. .............. | 350/347 V |
| 5,013,141 | 5/1991 | Sakata ..................... | 350/348 |

FOREIGN PATENT DOCUMENTS

| 0182632 | 7/1988 | Japan ................. 359/95 |
| 63-244004 | 10/1988 | Japan . |
| 1-140124 | 6/1989 | Japan . |

OTHER PUBLICATIONS

M. Kobayashi, et al, "2×2 optical waveguide matrix switch using nematic liquid crystal", IEEE Transactions on Microwave Theory and Techniques, vol. MTT-30, No. 10, Oct. 1982, pp. 1591-1598.

C. Hu, et al, "Optical Deflection in thin-film nematic-liquid-crystal waveguides", IEEE Journal of Quantum Electronics, QE-10, NO. 2, pp. 218-222, Feb. 1974.

Primary Examiner—John D. Lee
Assistant Examiner—S. W. Barns
Attorney, Agent, or Firm—Stevens, Davis, Miller & Mosher

[57] ABSTRACT

The voltage signal applied between a conductive thin film (2) and a transparent conductive thin film (6) changes the aligning direction of a liquid crystal layer (5) near the surface of a waveguide layer (4) so that the refractive index of the liquid crystal (5) for waveguide light (8) is changed thereby to change the equivalent refractive index for the waveguide light (8), and thus the diffraction angle of the radiated light (9) from the waveguide layer (4) including the cyclic structure (3G) formed therein is also changed to deflect the radiated light. If the waveguide light (8) is propagated in the direction perpendicular to the longitudinal direction of the arrangement of the cyclic structure (3G), which is arranged in the form of a concentric circle, and the radiated light (9) from the waveguide layer (4) is focused at a focusing point outside the waveguide layer (4), the deflection of the radiated light (9), which is caused by applying a voltage signal between the conductive thin film (2) and the transparent conductive thin film (6), produces a displacement of the focusing point. In particular, if the conductive thin film (2) or the transparent conductive thin film (6) is divided into a large number of sections and voltage signals are individually applied to such sections, the focusing point (F) can be displaced to any optional point.

13 Claims, 7 Drawing Sheets

LIGHT DEFLECTING DEVICE

TECHNICAL FIELD

The present invention relates to a control device for changing the direction of light or displacing the focusing point of the light.

BACKGROUND PRIOR ART

The prior art will be explained on the basis of e.g. an acoustooptic Bragg cell using an LiNbO$_3$ waveguide path disclosed in "HIKARI SHUSEKI KAIRO" by H. Nishihara et al., published by OHM Co., page 328, and an SAW light deflecting device disclosed in the lecture of the 35-th ŌYŌ BUTSURI GAKU KANKEI RENGŌ KŌENKAI 28a-ZQ-4. FIG. 1 shows the construction of the prior art light deflecting device. In FIG. 1, a Ti diffused waveguide layer 28 is formed on an LiNbO$_3$ substrate 27. Laser light 30 incident on an input prism 29 becomes waveguide light 31 propagating through the waveguide layer 28. The waveguide light 31 is separated into transmitted waveguide light 33 and diffracted waveguide light 34 by a SAW light deflecting device 32. Both waveguide lights 33 and 34 are radiated from an output prism 35 as transmitted light 36 and diffracted light 37. The diffraction angle of the diffracted waveguide light 34 depends on the pitch of an elastic wave 38 produced by the SAW light deflecting device 32, and the diffraction angle of the diffracted waveguide light 34 and hence the radiation direction of the diffracted light 37 can be changed by an electric signal applied to the SAW light deflecting device 32.

The prior art light deflecting device, however, has the following disadvantages. A change of the diffraction angle caused by the SAW light deflecting device 32 is slight, so that it has been impossible to deflect the diffracted light greatly by the SAW light deflecting device 32. Further, what is deflected is diffracted light, so that the efficiency of the use of energy of the input light 30 has been low.

SUMMARY OF THE INVENTION

An object of the invention is to overcome the disadvantages of the prior art and to provide a light deflecting device capable of causing a large degree of light deflection and having high efficiency of energy utilization.

In order to attain the above object, in accordance with the present invention, there is provided a light deflecting device comprising a conductive thin film formed on a substrate, a waveguide layer formed on the conductive thin film via an intervening transparent layer, and a transparent substrate having a transparent conductive thin film formed on its surface with a liquid crystal layer intervening between the transparent conductive thin film and the waveguide layer, the waveguide layer having a cyclical structure formed on its surface along the direction of propagation of the waveguide light, whereby the waveguide light is radiated by the cyclical structure as radiated light, and the direction of the radiated light is changed by applying a voltage signal between the conductive thin film and the transparent conductive thin film. Further, the light deflecting device of the present invention is characterized in that aligning means for aligning molecules of the liquid crystal layer is provided on the surface of the waveguide layer or the transparent conductive thin film so that the aligning direction is parallel or perpendicular to the propagation direction of the waveguide light. As another characteristic aspect of the device of this invention, the cyclical structure is formed in the shape of a concentric circle and the waveguide light is propagated perpendicularly to the cyclical structure and the radiated light from the waveguide layer is focused on one or more focusing points outside the waveguide layer, whereby the focusing point can be displaced by applying an electric signal between the conductive thin film and the transparent conductive thin film. Additionally, the conductive thin film or the transparent conductive thin film may be divided into a number of sections so that the focusing point can be changed by applying an individual voltage signal to each of the sections.

DESCRIPTION OF THE PREFERRED EMBODIMENTS

Now referring to FIGS. 2 to 10, several embodiments of the present invention will be explained.

Figure 1:
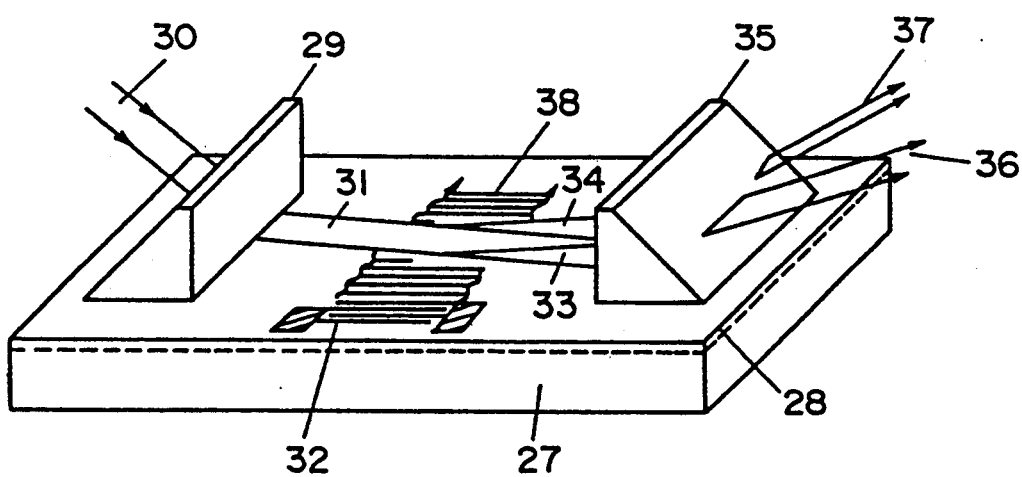
FIG. 1 is a perspective view showing a prior art light deflecting device.
Figure 2:
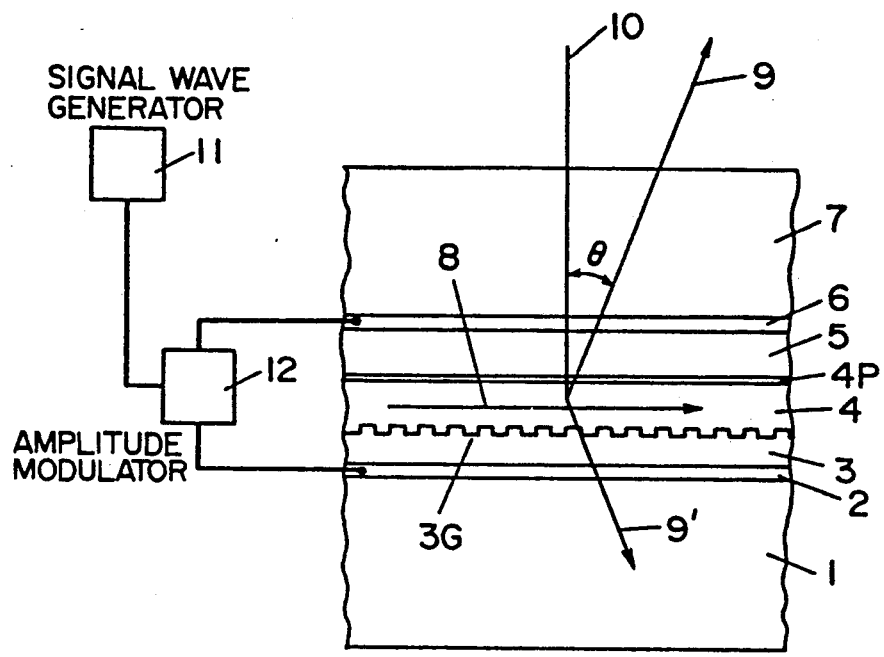
FIG. 2 is a sectional drawing showing the structure of the light deflecting device according to an embodiment of the present invention.

FIG. 2 is a sectional drawing of the light deflecting device according to an embodiment of the present invention. As seen from FIG. 2, sequentially formed on a substrate 1 are a conductive thin film 2, a transparent layer 3 and another transparent layer 4 having a refractive index higher than that of the transparent layer 3. A corrugated roughness in the shape of a grating 3G is formed on the transparent layer 3 and a transparent aligning film 4P made of polyimide, etc. is formed on the surface of the transparent layer 4. A composite layer consisting of the transparent layer 4 and the transparent aligning film 4P serves as a waveguide layer. A transparent conductive thin film 6 made of ITO, (Indium Tin Oxide) etc. formed on the surface of a transparent substrate 7 is held in fixed relation with the transparent conductive film 4P through a liquid crystal 5. The waveguide light 8 propagating through the waveguide layer (4, 4P) is separated into the light 9 radiated toward the liquid crystal 5 and the light 9' radiated toward the substrate 1 due to the presence of the grating 3G. The radiated light 9' is reflected from the surface of the conductive thin film 2 or the surface of the substrate 1 to overlap with the radiated light 9. The diffraction angle $\theta$ of the radiated light 9 (an angle which the radiated light 9 makes with a normal line 10 perpendicular to the substrate surface, strictly speaking, an angle between the radiated light 9 and the normal line 10 when the radiated light 9 is finally radiated into an air layer) can be expressed by $$\sin\theta = N + q\lambda/\Lambda \qquad (1)$$

where $\lambda$ is a wavelength of laser light, N is an equivalent refractive index of a waveguide path, $\Lambda$ is a pitch of the grating, and q is a coupling order number (in the case of coupling the waveguide light to two radiated beams, $q = -1$).

The aligning film 4P is subjected to polishing in the propagating direction of the waveguide light 8 or in the direction perpendicular thereto, and the aligning direction of the liquid crystal 5 near the surface of the aligning film coincides with the polishing direction. A signal wave generated by a signal wave generator 11 is amplitude-modulated by an amplitude modulator 12, and the signal thus produced is applied between the conductive thin film 2 and the transparent conductive thin film 6. The means for aligning the liquid crystal 5 may be provided on the surface of the transparent conductive thin film 6.

Figures 3A, 3B:
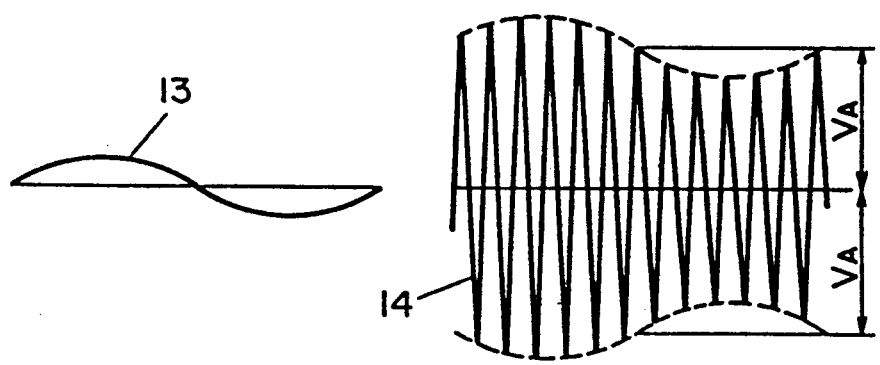
FIGS. 3a and 3b are explanatory drawings for illustrating the amplitude modulation of the signal wave used in the light deflecting device of FIG. 2.

FIGS. 3a and 3b show a signal wave 13 and an amplitude-modulated signal 14 produced by amplitude-modulating the signal wave 13. As seen from FIG. 3b, the envelope waveform of the amplitude-modulated signal 14 swings centering around the amplitude level $V_A$. It should be noted that, although a voltage signal to be applied to the electrodes is preferably amplitude-modulated in view of the hydrolysis of the liquid crystal as done in this embodiment, the signal wave 13 may be applied directly to the electrodes.

Figure 4A:
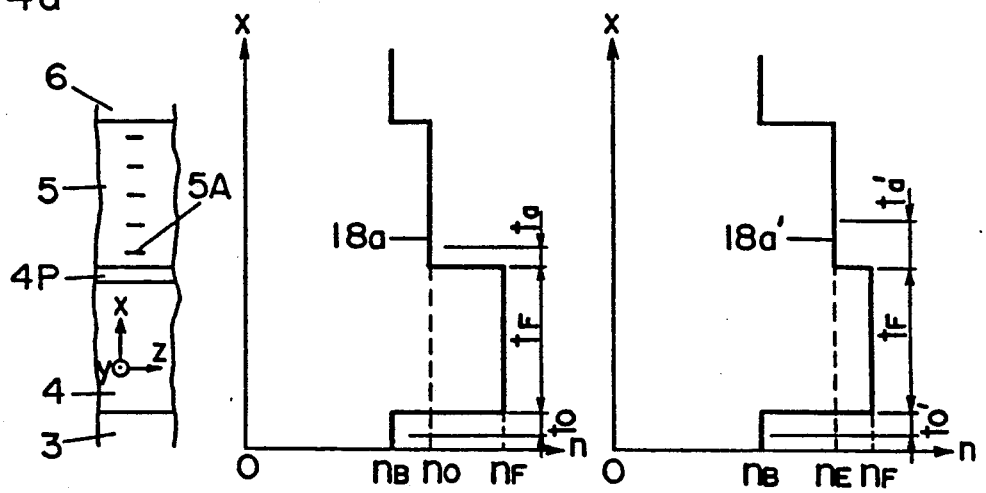
FIGS. 4a to 4c are explanatory drawings for illustrating changes in the direction of alignment of molecules of the liquid crystal layer and in the distribution of the refractive index.
Figure 4B:
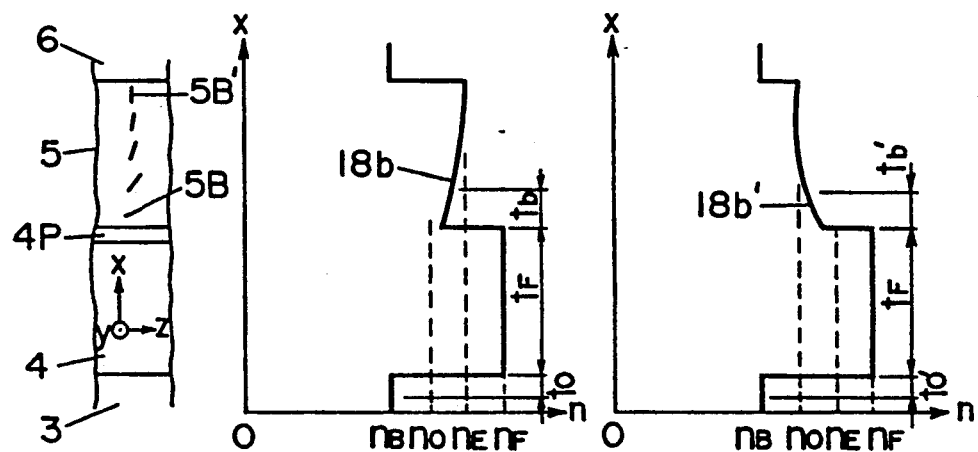
Figure 4C:
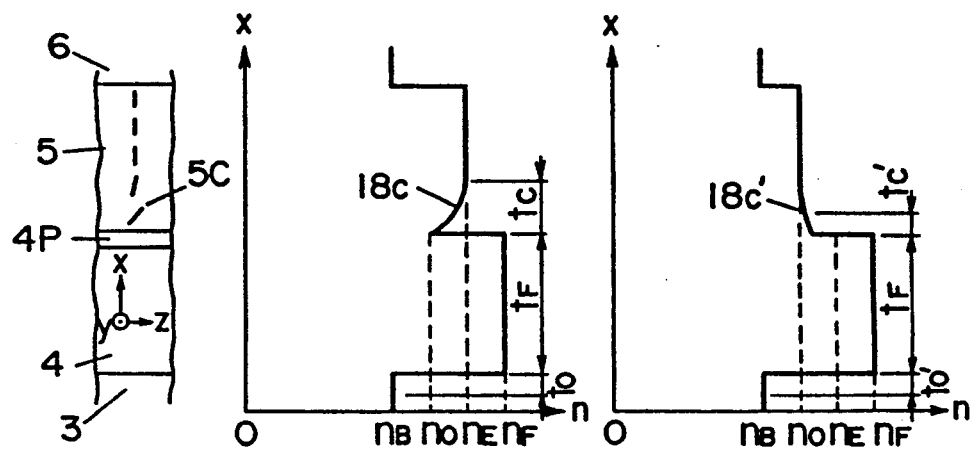

FIGS. 4a to 4c show changes in the aligning direction and in the distribution of the refractive index in the direction of the normal line which are caused by the application of the amplitude-modulated signal 14. (The abscissa n indicates a refractive index.) Generally, the liquid crystal 5 exhibits anisotropy of the refractive index, that is, the refractive index $n_0$ for ordinary light is smaller, than the refractive index $n_E$ for extraordinary light, and a change in the aligning direction occurs in a plane including the normal line 10 (the x-axis direction) to the substrate and the rubbing direction (the z-axis line). FIG. 4a shows a case where the amplitude of the amplitude-modulated signal 14 is small, and the aligning direction of liquid crystal molecules 5A is parallel to a surface of the aligning film 4P. Therefore, if the waveguide light 8 of the TM mode propagates in the rubbing direction (the z-axis direction) or in the direction perpendicular thereto (the y-axis direction, that is, the direction normal to the paper plane), the refractive index of the liquid crystal 5 for the waveguide light 8 is equal to the refractive index $n_0$ for ordinary light. Thus, the distribution of the refractive index of the liquid crystal 5 in the x-direction is substantially equal to $n_0$ and is shown by the distribution of 18a. Assuming that the film thickness of the transparent layer 4 is $t_F$, an equivalent thickness $T_{eff}$ of the waveguide layer is expressed by the sum of $T_F$ and the widths of two beams of evanescent light. Namely, assuming that the width of the evanescent light beam when the waveguide light 8 leaks out of the waveguide layer into the liquid crystal 5 is $t_a$ and the width of the evanescent light beam when the waveguide light leaks out into the transparent layer 3 is $t_0$, $T_{eff} = t_0 + T_F + t_a$ results. Additionally, although the propagation loss of the waveguide light propagating through a liquid crystal is generally as large as 20–30 dB/cm, a ratio of an amount of the evanescent light propagating in the liquid crystal 5 to a total amount of the waveguide light is small, so that the propagation loss of the waveguide light in total is small.

On the other hand, if the waveguide light 8 of the TE mode propagates in the direction (the y-axis) perpendicular to the aligning direction, the refractive index of the liquid crystal 5 for the waveguide light 8 is equal to the refractive index $n_E$ for extraordinary light. Thus, the distribution of the refractive index of the liquid crystal 5 in the normal line direction (the x-direction) becomes as shown by the distribution of 18a'. In this case, it is assumed that the width of the evanescent light beam when the waveguide light 8 oozes out of the waveguide layer into the liquid crystal 5 is $t_a'$ and the width of the evanescent light beam when the waveguide light 8 leaks out into the transparent layer 3 is $t_0'$.

FIG. 4b shows a case where the amplitude of the amplitude-modulated signal 14 is increased. As indicated by 5B', the aligning direction of liquid crystal molecules changes in the direction (the x-axis direction) perpendicular to the surface of the aligning film 4P, but liquid crystal molecules 5B near the aligning film 4P is not sufficiently aligned in the normal line direction because of a strong orientation keeping force caused by the aligning film 4P. Thus, if the waveguide light 8 of the TM mode propagates in the z-axis or y-axis direction, the refractive index of the liquid crystal 5 for the waveguide light is close to the refractive index $n_E$ for extraordinary light at a place near the transparent conductive thin film 6, while it is close to the refractive index $n_0$ for ordinary light at a place near the surface of the aligning film 4P. Accordingly, the distribution of the refractive index of the liquid crystal 5 in the normal line direction (the x-direction) is shown by the distribution of 18b. Here, assuming that the width of the evanescent light beam when the waveguide light oozes out of the waveguide layer into the liquid crystal 5 is $t_b$, then $t_b > t_a$ results. On the other hand, if the waveguide light 8 of the TE mode propagates in the y-axis direction, the refractive index of the liquid crystal 5 for the waveguide light is nearly equal to the refractive index $n_0$ at a place near the transparent conductive film 6, while it is nearly equal to the refractive index $n_E$ at a place near the surface of the aligning film 4P. Thus, the distribution of the refractive index of the liquid crystal 5 in the normal line direction (the x-direction) is shown by the distribution of 18b'. Assuming that the width of the evanescent light beam when the waveguide light oozes out of the waveguide layer into the liquid crystal 5 is $t_b'$, then $t_b' < t_a'$ results.

FIG. 4c shows a case where the amplitude of the amplitude-modulated signal 14 is further increased. The distributions 18b and 18b' of the refractive index converge to the distributions 18c and 18c', respectively, and the widths $t_b$ and $t_b'$ of the evanescent light beam converge to the widths $t_c$ and $t_c'$, respectively, and $t_c > t_b$ and $t_c' < t_b'$ hold.

Figure 5A:
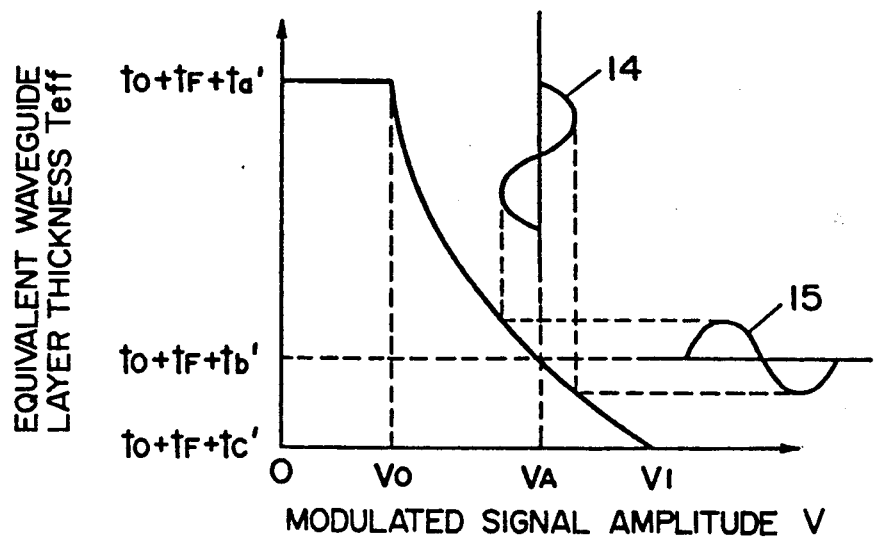
FIGS. 5a and 5b are graphs showing the relationships between the amplitude v of an amplitude modulated signal and the equivalent thickness $T_{eff}$ of the waveguide layer, and between the equivalent thickness $T_{eff}$ of the waveguide layer and the equivalent refractive index N, respectively, in the present invention.

As a result, when the waveguide light 8 of the TE mode propagates in the y-axis direction, the relationship between the amplitude V of the amplitude-modulated signal 14 and the equivalent thickness $T_{eff}$ of the waveguide layer is such as shown by the graph of FIG. 5a. As seen from the graph, when the amplitude V of the amplitude-modulated signal 14 is small ($v < v_0$), the equivalent thickness $T_{eff}$ is equal to $t_0 + T_F + t_a'$, while when the amplitude v exceeds $v_1$, $T_{eff} = t_0 + T_F + t_c'$ results. In the case of $v_0 < v < v_1$, $T_{eff}$ monotonously decreases with an increase in the amplitude v. Thus, if the amplitude V is made to swing centering around the amplitude $V_A$ as shown by the waveform 14, $T_{eff}$ is represented by the waveform 15 which varies centering around $t_0 + T_F + t_b'$.

Figure 5B:
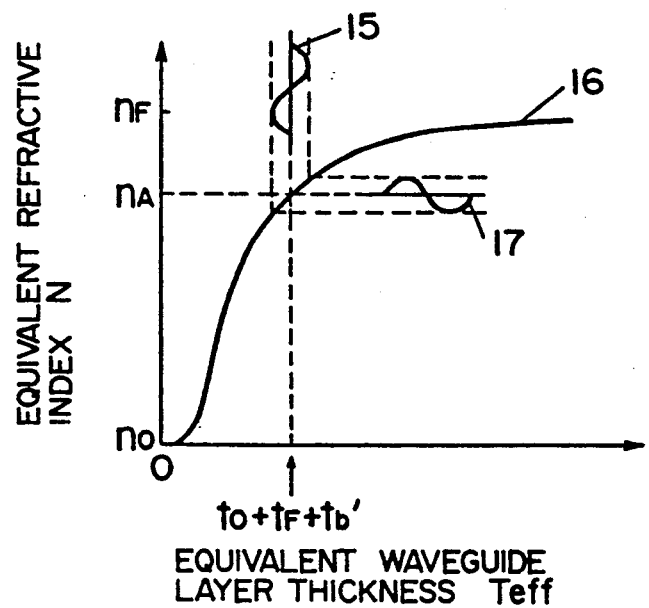

FIG. 5b is a graph showing the relationship between the equivalent waveguide layer thickness $T_{eff}$ and the equivalent refractive index N. As seen from the graph, the equivalent refractive index N is represented by a curve 16, which shows a monotonous increase from $n_0$ to $n_F$, with an increase in the equivalent waveguide layer thickness $T_{eff}$. (If the refractive index $n_B$ of the transparent layer 3 is greater than $n_0$, then $n_0$ is replaced by $n_B$.) As mentioned above, if the equivalent thickness $T_{eff}$ varies as shown by the waveform 15 centering around $t_0 + T_F + t_b'$, the equivalent refractive index is shown by a waveform 17 which swings centering around NA.

As understood from Equation (1), a variation in the equivalent refractive index N results in a variation in the diffraction angle $\theta$, so that a variation in the diffraction angle of the radiated light is caused by a variation in the value of $T_{eff}$, which implies that a variation in the amplitude v of the amplitude-modulated signal 14 can cause a variation in the diffraction angle of the radiated light. A variation in the equivalent refractive index N to be caused by a variation in the amplitude of the amplitude-modulated signal 14 is expected to be about $(n_F - n_0) \times (0.1 - 0.3)$. Assuming that a variation of 0.1 has been obtained in the equivalent refractive index N, the diffraction angle $\theta$ can be deflected about by 10 degrees centering amount $\theta = 45$ degrees. Also, since a change of the aligning direction of the liquid crystal 5 near the surface of the waveguide layer, where the orientation keeping force is strong, is utilized, the response of the deflection is quick.

Further, although FIGS. 5a and 5b have been explained in connection with an exemplary case where the waveguide light 8 of the TE mode propagates in the direction (the y-axis direction) perpendicular to the aligning direction, the above explanation applies also to a case where the waveguide light of the TM mode propagates in the aligning direction (the z-axis direction) or in the direction (the y-axis direction) perpendicular thereto. Specifically, similarly to the illustration of FIG. 5a, when the amplitude v of the amplitude-modulated signal 14 is in the range of $v < v_0$, $T_{eff} = t_0 + T_F + t_a$ holds. When the amplitude v exceeds $v_1$, $T_{eff} = t_0 + T_F + t_c$ hold. When $v_0 < v < v_1$, $T_{eff}$ monotonously increases with an increase in the amplitude v, and, if the amplitude v is varied as shown by the waveform 14 centering around $v_A$, $T_{eff}$ varies with a waveform similar to the waveform 15 which swings centering amount $t_a + T_F + t_b$. Thus, the deflection of the radiated light can be likewise realized by controlling the amplitude of the amplitude-modulated signal.

Additionally, generally, the higher a ratio of the amount of the evanescent light to the amount of the waveguide light is, the greater becomes a rate of change in the equivalent refractive index. Thus, in FIGS. 4a, 4b and 4c, if $n_O > n_B$, the equivalent refractive index for the waveguide light is easily varied. Particularly, the variation of the equivalent refractive index is effected most remarkably if $n_E > n_F$ holds.

Figure 6A:
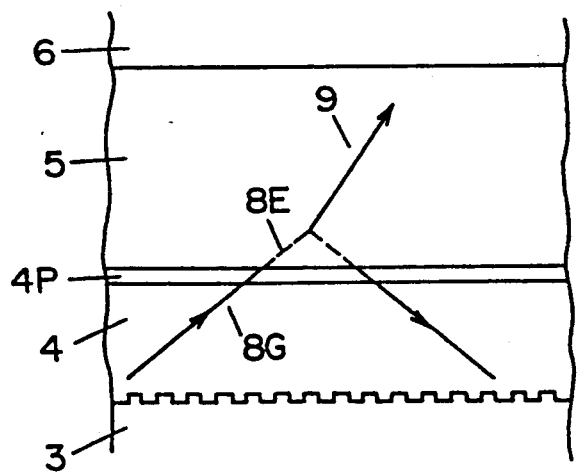
FIGS. 6a and 6b are explanatory drawings for illustrating the influence of the anisotropy of the refraction index of the liquid crystal on the light polarization.
Figure 6B:
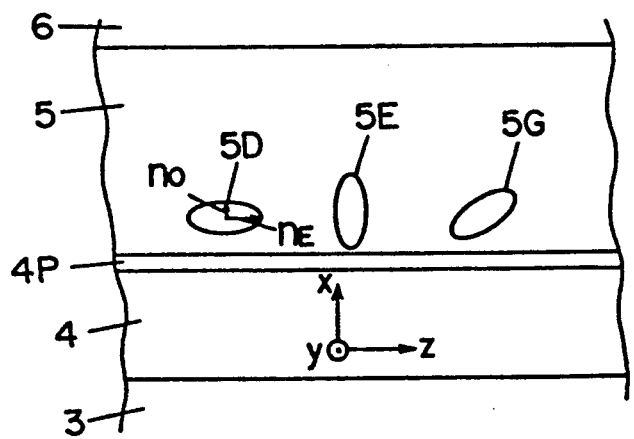

FIGS. 6a and 6b illustrate the influence on the polarization of the waveguide light and the radiated light by the refractive index anisotropy of the liquid crystal. In FIG. 6a, the beam of the waveguide light travels as shown by 8G and leaks out as the evanescent light (the light wave 8E) into the liquid crystal. The radiated light 9 is generally a light beam which obliquely traverses the liquid crystal. In FIG. 6b, 5D, 5E and 5G are respectively refractive index ellipse bodies indicative of the refractive index anisotropy of the liquid crystal, and they respectively correspond to the liquid crystal molecules 5A, 5B' and 5B in FIG. 4. These ellipse bodies are represented by a major axis having a length of $n_E$ and two minor axes which are perpendicular to the major axis and have a length of $n_0$, and the major axis lies in the x-z plane. The electric field vector for the waveguide light is in the y-axis direction (perpendicular to the paper plane) or in the x-axis direction when the waveguide light is of the TE mode light traveling in the z-axis direction or of the TM mode light, respectively. Also, the electric field vector for the waveguide light is in the z-axis direction or in the x-axis direction when the waveguide light is of the TE mode light traveling in the y-axis direction or the TM mode light, respectively. Generally, the influence on the polarization of the linearly polarized light propagating through a medium having refractive index anisotropy depends on the positional relationship between the cut end of the ellipse shape, when the refractive index ellipse body is cut along a plane perpendicular to the propagation direction of the linearly polarized light, and the oscillation plane of the linearly polarized light. Specifically, if the oscillation plane and the major axis of the cut end ellipse shape are in a parallel or perpendicular positional relationship, the light remains to be the linearly polarized light without being subject to the influence by the anisotropy of the liquid crystal. However, if they deviate from the above positional relationship, the light becomes elliptically polarized light. Thus, in the case where the refractive index ellipse body is shown by 5D in FIG. 6b, the oscillation plane of the waveguide light of the TM mode propagating in the z-axis or y-axis direction, or that of the TE mode propagating in the z-axis direction is perpendicular to the major axis of the cut end ellipse shape, so that its evanescent light (the light wave 8E oozing out into the liquid crystal) retains the linearly polarized light property. The oscillation plane of the waveguide light of the TE mode propagating in the y-axis direction is parallel to the major axis of the cut end ellipse shape, so that its evanescent light also retains the linearly polarized light property. Therefore, the evanescent light which passes the liquid crystal layer and returns to the waveguide layer remains in the original mode, and it is not subjected to the influence by the anisotropy of the liquid crystal. Likewise, the linear polarization property of the radiated light 9 from the waveguide light of the TM mode propagating in the z-axis or y-axis direction, or that of the TE mode propagating in the z-axis direction is maintained, and the linear polarization property of the radiated light 9 from the waveguide light of the TE mode propagating in the y-axis direction is also maintained.

On the other hand, in the case where the refractive index ellipse body is inclined like 5G in FIG. 6b with respect to the z-axis in the x-z plane, the evanescent light due to the waveguide light propagating in the z-axis direction maintains the linear polarization property regardless of the TE or TM mode. However, the evanescent light of both TE and TM modes propagating in the y-axis direction is subject to the influence by the anisotropy of the liquid crystal and becomes elliptically polarized light, and, upon returning to the waveguide layer, it is separated into the TE mode component and the TM mode component. Likewise, the radiated light from the waveguide light propagating in the z-axis direction maintains the linear polarization property regardless of the TE or TM mode, whereas, the radiated light from the waveguide light of both TE and TM modes propagating in the y-axis direction is subject to the influence by the anisotropy of the liquid crystal and it generally becomes elliptically polarized light.

Thus, when the major axis of the refractive index ellipse body is inclined with respect to the z-axis and the waveguide light propagates in the y-axis direction, the waveguide light is separated into the TE and TM mode components, and at the same time the beams of the elliptically polarized light having different diffraction angles are produced from the waveguide light of the respective modes. As explained in connection with FIG. 5a, in the TE mode, when $v_0 < v < v_1$ holds $T_{eff}$ monotonously decreases with an increase in the amplitude V, whereas in the TM mode, it monotonously increases. That is, even when the same signal is applied, the polarity of the variation of $T_{eff}$ differs between the TE mode and the TM mode and hence differs in the direction of deflection of the radiated light. Therefore, when the waveguide light is separated into the TE mode and the TM mode, two beams of radiated light having close radiation angles are produced, and in spite of the application of the same voltage signal, the direction of deflection of these waveguide light beams are opposite to each other, which is undesirable for the light deflecting device. It is desirable for the direction of propagation of the waveguide light to be in the aligning direction (the z-axis direction). In addition, the refractive index of the liquid crystal for the waveguide light of the TE mode propagating in the z-axis direction remains noeven if the aligning direction of the liquid crystal changes in the x-z plane, which makes it impossible to deflect the radiated light. Thus, the waveguide light must be of the TM mode.

Figure 7:
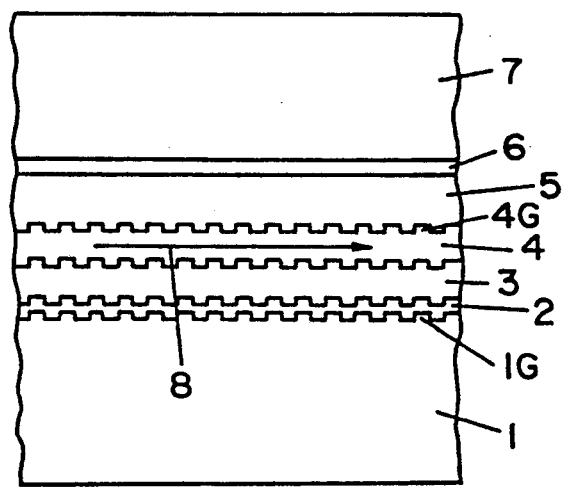
FIG. 7 is a sectional drawing showing the structure of the light deflecting device according to a second embodiment of the present invention.

FIG. 7 is a sectional drawing showing the structure of the light deflection device according to a second embodiment of the present invention. Like reference numerals in FIG. 7 designate like elements in FIG. 2. As seen from FIG. 7, a corrugated roughness in the shape of a grating 1G is formed on the substrate 1, and sequentially formed on the grating 1G are the conductive film 2, the transparent layer 3 and the waveguide layer 4 having a higher refractive index than that of the transparent layer 3. The transparent. conductive thin film 6 made of ITO (Indium Tin Oxide) etc. which is formed on the surface of the transparent substrate 7, is held in fixed relation with the waveguide layer 4 through the liquid crystal layer 5. Since the thicknesses of the incorporation of the conductive thin film 2, the transparent layer 3 and the waveguide layer 4 is very small, a grating 4G corresponding to the grating 1G is formed on the surface of the waveguide layer 4, and this grating 4G serves to radiate the waveguide light 8 propagating through the waveguide layer 4 and also to align the liquid crystal molecules in the liquid crystal layer 5. This embodiment corresponds to a case where the waveguide light propagates in the direction perpendicular to the aligning direction, and so there are involved the problems of the mode separation of the waveguide light, the influence of polarization on the radiated light, etc. However, since the grating 4G, which is means for radiating the waveguide light, serves also as means for aligning the liquid crystal layer, any aligning means such as polyimide, etc. is not required, so that the construction of the light deflecting device can be made simpler. In addition, in this second embodiment, the corrugated roughness in the shape of a grating may be located on the surface of the conductive thin film 2, the transparent layer 3, or the like.

Figure 8:
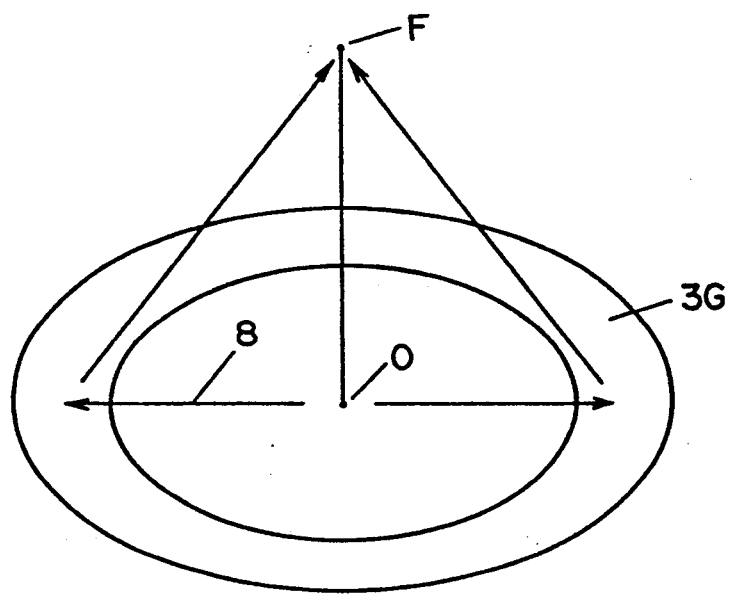
FIG. 8 is an explanatory drawing for illustrating a mode of light deflection by the light deflecting device according to a third embodiment of the present invention.

FIG. 8 is an explanatory drawing for explaining the structure of the light deflecting device according to a third embodiment of the present invention. The sectional configuration thereof is the same as that of the first embodiment shown in FIG. 2. In FIG. 8, the grating 3G such as shown in FIG. 2 forms concentric circles around a center point 0. In the operation thereof, the waveguide light 8 is propagated in the direction perpendicular to the grating 3G. If the radiated light from the waveguide light is focused on a focusing point F outside the waveguide layer by the grating 3G which has its grating pitch formed to be modulated, the deflection of the radiated light, which is caused by the voltage signal applied between the conductive thin film 2 and the transparent conductive thin film 6, gives rise to a displacement of the focusing point F along a line OF.

Figure 9:
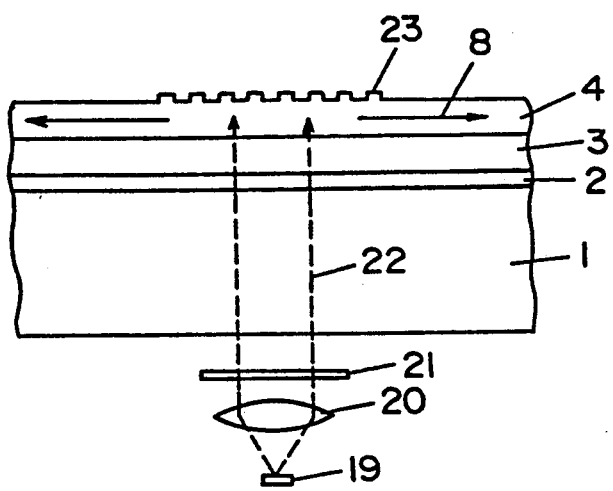
FIG. 9 is an explanatory sectional drawing for illustrating the structure of the third embodiment of the present invention in which the waveguide light is transmitted from the center of the device in the radial direction.

FIG. 9 shows an example of the structure for propagating the waveguide light 8 in the direction perpendicular to the grating 3G arranged in the shape of a concentric circle in the third embodiment. In the operation thereof, the output light emitted from a semiconductor laser 19 turns parallel light through a focusing lens 21, and then the parallel light becomes circularly polarized light 22 as the parallel light passes a quarter-wave plate 21. The waveguide layer 4 is formed on the substrate 1 with the conductive thin film 2 and the transparent layer 3 intervening therebetween, the waveguide layer 4 having a refractive index higher than that of the transparent layer 3. A corrugated roughness in the shape of a grating 23 formed by using a photoresist, etc. and arranged in the shape of a concentric circle is provided on the surface of the waveguide layer 4. The circularly polarized light 22 is coupled into the waveguide layer 4 as an input thereto by the grating 23 which serves as a coupler, whereby the circularly polarized light 22 becomes the waveguide light 8 propagating in the radial direction.

Figure 10:
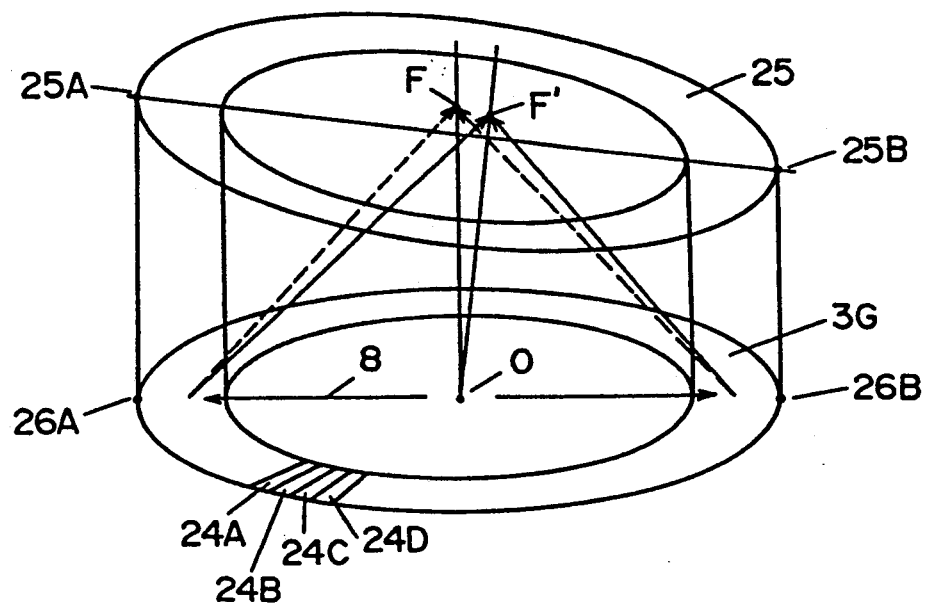
FIG. 10 is an explanatory drawing for illustrating a further mode of light deflection by the light deflecting device according to the third embodiment of the present invention.

FIG. 10 is an explanatory drawing for explaining the light deflecting device according to a fourth embodiment of the present invention. Like the third embodiment shown in FIG. 8, the grating 3G is of the form of a concentric circle centering around a point 0. In the operation thereof, the waveguide light 8 is propagated in the direction perpendicular to the grating 3G, and the light radiated from the waveguide layer is focused on a focusing point F outside the waveguide layer. The conductive thin film 2 or the transparent conductive thin film 6 is divided into a number of sections such as 24A, 24B, 24C, 24D, etc. in the radial (radius) directions, and individual voltage signals can be applied separately to the respective sections. If the magnitude of the voltage signals applied to the respective sections is represented by using a hollow cylinder with its bottom surface formed by the surface of the grating 3G, the height of each point on the circumference of a cut end plane 25, which is obtained by cutting the hollow cylinder along a plane, measured from the surface of the grating 3G (e.g. assuming that points 26A and 26B are feet of perpendiculars dropped to the bottom surface 3G, respective distances between points 25A and 26A and between points 25B and 26B) represents the amplitude v of an amplitude-modulated signal applied to each section corresponding to each point on the above circumference. A straight line drawn to pass the points 25A and 25B passes the center of the cut end plane 25, and it intersects at right angles a straight line of intersection between the cut end plane 25 and the bottom surface 3G. Thus, if the cut end plane 25 becomes not parallel to the bottom surface 3G depending on the magnitude of the individual voltage signals applied to the respective sections, the focusing point is shifted from point F to point F' in the plane including the points 25A, 25B and 26A, and 26B. this means that the height of the cut end plane 25 relates to the displacement of the focusing point in the direction of the optical axis OF, whereas the degree of inclination of the cut end plane 25 relates to the displacement of the focusing point in the direction perpendicular to the optical axis OF. Thus, in spite that, in the third embodiment, the focusing point can be displaced only along the optical axis OF, in this fourth embodiment, the focusing point can be displaced to any optional position by applying individual voltage signals separately to such a number of sections as 24A, 24B, 24C and 24D, etc. Additionally, the conductive thin film 2 or the transparent conductive thin film 6 is not necessarily divided in the radial (radius) directions, but may be divided in any other manner.

FIELD OF INDUSTRIAL UTILIZATION

As understood from the explanation as made above, the light deflecting device in accordance with the present invention serves as a device for deflecting radiated light which is capable of realizing a great degree of deflection by virtue of its operation such that the voltage signal applied between the conductive thin film and the transparent conductive thin film changes the aligning direction of molecules of the liquid crystal near the surface of the waveguide layer, whereby the refractive index of the liquid crystal for the waveguide light is changed thereby to change the equivalent refractive index for the waveguide light, and, as a result, the diffraction angle of the radiated light from the waveguide layer is changed. Further, since a change of the aligning direction of the molecules of the liquid crystal near the surface of the waveguide layer having a strong orientation keeping force is utilized to deflect the radiated light, a quick response of the deflection can be obtained. Further, since the whole waveguide light is radiated towards both the liquid crystal side and the substrate side and the radiated light on the substrate side is reflected from the conductive thin film on the surface of the substrate and overlaps the radiated light on the liquid crystal side, an amount of the radiated light on the liquid crystal side is increased, and, as a result, the efficiency of using energy of the deflected light is elevated. On the other hand, if the waveguide light is propagated in the direction perpendicular to the structure of corrugated roughness arranged in the form of a concentric circle and the radiated light from the waveguide layer is focused on a focusing point outside the waveguide layer, the deflection of the radiated light caused by the application of a voltage signal between the conductive thin film and the transparent conductive thin film can be utilized to produce a displacement of the focusing point. In particular, if the conductive thin film or the transparent conductive thin film is divided into a number of sections and individual voltage signals are applied separately to the respective sections, the focusing point can be shifted to any optional point. Therefore, it is possible for the present invention to provide a practically very effective new device as a new light deflecting device or a new variable focusing point device.

We claim:
1. A light deflecting device comprising:
   a substrate,
   a conductive thin film formed on said substrate,
   a waveguide layer for transmitting waveguide light therethrough, said waveguide layer being formed on said conductive thin film,
   a transparent substrate,
   a transparent conductive thin film formed on a surface of said transparent substrate,
   a liquid crystal layer interposed between said transparent conductive thin film and said waveguide layer, said waveguide layer having a cyclical structure formed on its surface along the direction of propagation of the waveguide light, said cyclical structure including means for cooperating with said waveguide layer and said liquid crystal layer to radiate the waveguide light as radiated light outside of said waveguide layer such that the direction of the radiated light is changed by applying a voltage signal between said conductive thin film and said transparent conductive thin film.
2. A light deflecting device according to claim 1, wherein a refractive index of said waveguide layer is larger than that of said liquid crystal layer for ordinary light.
3. A light deflecting device according to claim 1, wherein said voltage signal is an amplitude-modulated wave.
4. A light deflecting device according to claim 1, wherein aligning means for aligning molecules of said liquid crystal layer is formed on a surface of selected one of said waveguide layer and said transparent conductive thin film.
5. A light deflecting device according to claim 1, wherein said cyclical structure is formed as a corrugation on a surface of said waveguide layer, and said cyclical structure is used as aligning means for aligning molecules of said liquid crystal layer.
6. A light deflecting device according to claim 4 or 5, wherein the direction of alignment of the molecules of said liquid crystal layer caused by said aligning means is in selected one of the parallel direction and the perpendicular direction with respect to that of propagation of the waveguide light.
7. A light deflecting device according to claim 6, wherein, when the direction of alignment of the molecules of said liquid crystal layer caused by said aligning means is parallel to the direction of propagation of the waveguide light, said waveguide light is in a TM mode.

8. A light deflecting device according to claim 1, wherein said cyclical structure is of selected one of the shape of a concentric circle and the shape of a spiral, the waveguide light is propagated in the direction perpendicular to the longitudinal direction of the arrangement of said cyclical structure so that the light radiated from said waveguide layer is focused on one or more focusing points, and the focusing points are displaced by the application of the voltage signals.

9. A light deflecting device according to claim 8, wherein selected one of said conductive thin film and said transparent conductive thin film is divided into a number of sections, and said focusing point is displaced by applying the individual voltage signals to said respective sections.

10. A light deflecting device according 9, wherein said sections are in the shape of sectors formed by dividing said selected one of said conductive thin film and said transparent conductive thin film along the lines in the direction of propagation of the waveguide light.

11. A light deflecting device comprising:
a substrate,
a conductive thin film formed on said substrate,
a waveguide layer for transmitting waveguide light therethrough, said waveguide layer being formed on said conductive thin film,
a transparent layer interposed between said waveguide layer and said conductive thin film,
a transparent substrate,
a transparent conductive thin film formed on a surface of said transparent substrate,
a liquid crystal layer interposed between said transparent conductive thin film and said waveguide layer, said waveguide layer having a cyclical structure formed on its surface along the direction of propagation of the waveguide light, said cyclical structure including means for cooperating with said waveguide layer and said liquid crystal layer to radiate waveguide light as radiated light outside of said waveguide layer such that the direction of the radiated light is changed by applying a voltage signal between said conductive thin film and said transparent conductive thin film.

12. A light deflecting device according to claim 11, wherein said cyclical structure is formed as a corrugated roughness on a surface of a selected one of said substrate, said conductive thin film formed on said substrate, said transparent layer, and said waveguide layer.

13. A light deflecting device according to claim 11, wherein the refractive index of said liquid crystal layer for the ordinary light is larger than that of said transparent layer.

* * * * *